Dec. 2, 1969  L. ROW  3,481,371
GRAIN TRUCK COVER
Filed Dec. 13, 1967

INVENTOR
LAWRENCE ROW
By:- Smott & Biggs
ATTORNEYS

3,481,371
GRAIN TRUCK COVER
Lawrence Row, Dundern, Saskatchewan, Canada
Filed Dec. 13, 1967, Ser. No. 690,312
Int. Cl. D03d 25/00, 23/00; B60p 7/02
U.S. Cl. 139—419                    5 Claims

ABSTRACT OF THE DISCLOSURE

An open mesh grain truck cover preferably formed of synthetic plastics material woven to provide interstices which are large enough for a kernel of grain to pass through but which have a maximum chordwise dimension of about 5 millimeters.

---

BACKGROUND OF THE INVENTION

It is well known that high grain losses will occur if grain is transported in open-boxed vehicles without providing a suitable cover to prevent the grain from being blown out in transit. For example, the Manitoba Department of Agriculture has been making tests to determine the quantity of cereal grains lost from open trucks under various conditions. During their tests they found, inter alia, that seventeen bushels of wheat were lost from a lefel-loaded truck travelling 8 miles at 30 m.p.h. against an 18-20 m.p.h. wind, that twenty-four bushels of feed oats were lost from a level-loaded truck travelling 8 miles at 30 m.p.h. against a 1-2 m.p.h. wind, that eleven bushels of barley were lost where the truck travelled 8 miles at 50 m.p.h. against a 3 m.p.h. wind, and that fourteen bushels of flax were lost where the truck travelled 3 miles at 25 m.p.h. against a 20 m.p.h. wind.

The above-mentioned losses are undesirable, not only because of the resultant loss of income to the farmer, but also because said losses serve to spread seeds over the adjacent countryside.

In order to prevent the above disadvantages open-boxed vehicles used to transport grain are usually covered with a tarpaulin or the like. Until now, it has been believed that a canvas or similar type of closely woven material was the only material suitable from which to form a tarpaulin for the above purpose. However, such tarpaulins are expensive, have a tendency to tear in the wind and can be very heavy to handle, especially when wet. They are also subject to rotting if not carefully looked after. In my experience, I have found that canvas or the like tarpaulins seldom last more than two years.

SUMMARY OF THE INVENTION

I have made the surprising discovery that the above-mentioned disadvantages may be overcome by providing an openly woven mesh cover which can be fabricated from synthetic plastics material and which is woven to provide a mesh having interstices which are large enough for a kernel of grain to pass through but which have a maximum chordwise dimension of about 5 millimeters. Such material may be very light weight and will last almost indefinitely. I have found that threads formed of polyethylene glycol terephthalate resin and sold under the trade mark "Mylar" are particularly suitable, but other plastics material such as nylon may be used. Because of the openly woven structure of the cover, it is light in weight and the tendency for the cover to tear in the wind is eliminated.

I am not sure of the principle upon which the cover according to my invention works, for although there are holes or interstices in the cover large enough for grain to slip through, it seems that the effect of the wind slipping across the material while the vehicle is moving is such as to prevent any grain from blowing away, even if the grain is piled higher than the sides of the open box of the vehicle. One possible explanation is that the openly woven mesh cover slows the air stream passing over the top of the load of grain thereby making the air pressure within the interstices slightly higher than the air pressure of the air stream passing over the cover which would accordingly prevent the grain from escaping. This theory seems to be borne out by experiments I have made where I have found that air pressure directed directly down on the cover from above will cause grain to escape through the interstices in the mesh, while air pressure directed across the mesh cover does not have this effect. In any event, it is not intended that the invention be restricted to and particular theory of operation.

BRIEF DESCRIPTION OF THE DRAWINGS

In the drawings which illustrate the embodiments of the invention.

DESCRIPTION OF THE PREFERRED EMBODIMENTS

Figure 1:
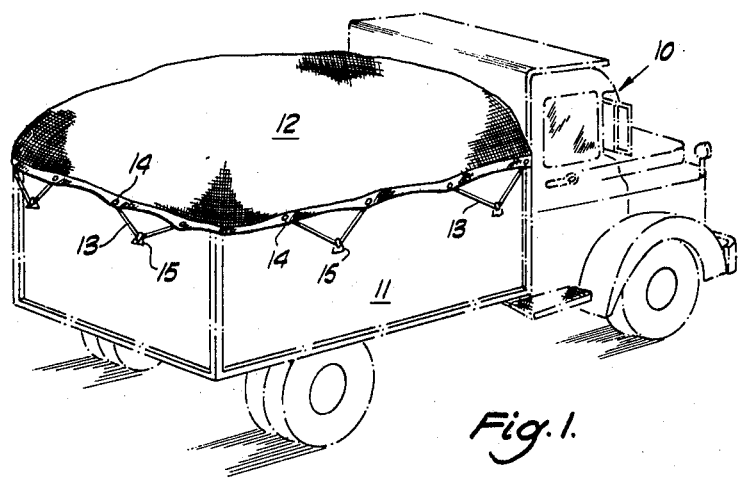
FIGURE 1 illustrates a truck having an open box loaded with grain and covered with an openly woven mesh grain cover according to my invention.

Referring now more particularly to the drawings, there is shown in FIGURE 1 a truck 10 having an open box 11 which is loaded with grain and covered with a grain cover 12. The drawing shows the grain piled higher than the sides of box 11 since it is not necessary to load the grain level when using the cover of the invention. The cover 12 is secured by ropes 13 which pass through grommets 14 in the cover 12 and hooks 15 on the side of the box 11. However, any suitable means may be used to secure the cover in place.

Figure 2:
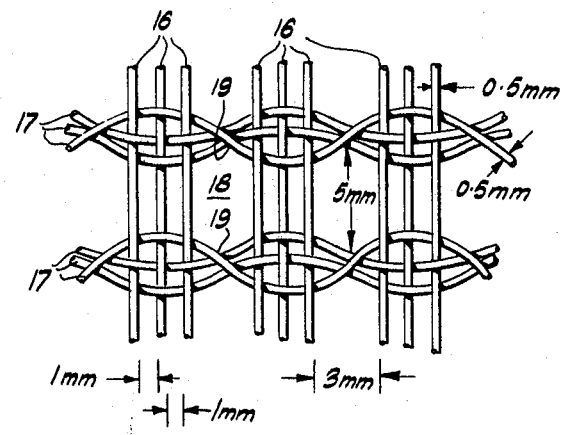
FIGURE 2 is an enlarged plan view of a preferred mesh.

An enlarged plan view of part of grain cover 12 is seen in FIGURE 2. It will be noted that the preferred mesh of my invention comprises weft threads 16 which are substantially parallel to one another and which are arranged in groups of three. As shown in FIGURE 2, the weft threads comprising each such group of three are spaced approximately 1 millimeter apart, while, the groups of three weft threads are spaced about 3 millimeters from each other.

There are also provided warp threads 17 which are also arranged in groups of three. The warp threads 17 within each such group are braided with each other and are also woven through the weft threads 16 so as to provide the required open mesh which is here characterized by hexagonal interstices 18. It is to be noted that each hexagonal interstice has apices 19 which are about 5 millimeters apart and which are defined by adjacent groups of braided threads.

The weft and warp threads 16 and 17 may be formed of synthetic plastics material such as polyethylene glycol terephthalate resin sold under the trade mark "Mylar," or nylon, and in this case have a diameter of about 0.5 millimeter. It is, however, believed that the weft and warp threads 16 and 17, in order to provide a practical cover, should have a diameter of at least 0.4 millimeter.

It is not intended to limit this invention to the specific embodiment above described, the invention being as defined in the appended claims.

What I claim as my invention is:

1. In combination with a grain filled open-boxed vehicle, an openly woven mesh cover extended over said open-box to keep grain from being blown from the box during transit, said cover comprising warp threads and weft threads woven to provide a mesh having interstices which are sufficiently large for a kernel of grain to pass through, said interstices ranging between about 3 millimeters in their smallest dimensions and about 5 millimeters in their largest chordwise dimensions.

2. In combination with a grain filled open-boxed vehicle, an openly woven mesh cover as defined in claim 1 wherein said weft threads are arranged substantially parallel one another in groups of three, the weft threads within each group being spaced about 1 millimeter apart, the groups of weft threads being spaced about 3 millimeters apart, and said warp threads are arranged in groups of three, the warp threads within each group being braided with each other and being woven through said weft threads so as to provide an open mesh having hexagonal interstices, each hexagonal interstice having apices which are about 5 millimeters apart and which are defined by adjacent groups of braided warp threads.

3. In combination with a grain filled open-boxed vehicle, an openly woven mesh cover as defined in claim 2 wherein said warp threads and said weft threads are formed of synthetic plastics material, and have a diameter of at least 0.4 millimeter.

4. In combination with a grain filled open-boxed vehicle, an openly woven mesh cover as defined in claim 3 wherein said synthetic plastics material is nylon.

5. In combination with a grain filled open-boxed vehicle, an openly woven mesh cover as defined in claim 3 wherein said synthetic plastics material is polyethylene glycol terephthalate resin.

References Cited

UNITED STATES PATENTS

| | | | |
|---|---|---|---|
| 181,047 | 8/1876 | Cremer | 296—100 |
| 893,413 | 7/1908 | Wood | 296—100 |
| 2,696,847 | 12/1954 | Cotterill et al. | 139—420 |
| 2,731,046 | 1/1956 | Bachner | 139—420 |

HENRY S. JAUDON, Primary Examiner

U.S. Cl. X.R.

139—383; 296—100